US008832541B2

(12) United States Patent
Laskaris et al.

(10) Patent No.: US 8,832,541 B2
(45) Date of Patent: Sep. 9, 2014

(54) METHOD AND SYSTEM TO CONVERT VISUALLY ORIENTATED OBJECTS TO EMBEDDED TEXT

(75) Inventors: Lucas George Laskaris, Tampa, FL (US); Willem H. Reinpoldt, III, Windermere, FL (US)

(73) Assignee: Vastec, Inc., Tampa, FL (US)

( * ) Notice: Subject to any disclaimer, the term of this patent is extended or adjusted under 35 U.S.C. 154(b) by 436 days.

(21) Appl. No.: 13/009,902

(22) Filed: Jan. 20, 2011

(65) Prior Publication Data

US 2012/0192059 A1    Jul. 26, 2012

(51) Int. Cl.
*G06F 17/00*  (2006.01)
*G06F 17/22*  (2006.01)
*G09B 21/00*  (2006.01)
*G06F 17/24*  (2006.01)
*G06K 9/00*  (2006.01)
*G10L 13/00*  (2006.01)

(52) U.S. Cl.
CPC .......... *G06F 17/241* (2013.01); *G06F 17/2264* (2013.01); *G09B 21/006* (2013.01); *G06K 9/00442* (2013.01); *G10L 13/00* (2013.01); *G06K 2209/25* (2013.01)
USPC ....................................................... 715/200

(58) Field of Classification Search
USPC ....................................................... 715/200
See application file for complete search history.

(56) References Cited

U.S. PATENT DOCUMENTS

| | | | | |
|---|---|---|---|---|
| 7,424,129 | B2 * | 9/2008 | Hull et al. ..................... | 382/100 |
| 7,451,389 | B2 * | 11/2008 | Huynh et al. ................. | 715/230 |
| 7,703,036 | B2 * | 4/2010 | Satterfield et al. ............ | 715/777 |
| 8,170,392 | B2 * | 5/2012 | Rakib et al. .................... | 386/241 |
| 8,170,862 | B2 * | 5/2012 | Konno .............................. | 704/3 |
| 8,176,563 | B2 * | 5/2012 | Redlich et al. .................. | 726/27 |
| 8,201,088 | B2 * | 6/2012 | Levantovsky et al. ........ | 715/269 |
| 8,612,231 | B2 * | 12/2013 | Grobauer et al. ............. | 704/270 |
| 2001/0031066 | A1 * | 10/2001 | Meyer et al. .................. | 382/100 |
| 2001/0049602 | A1 * | 12/2001 | Walker et al. ................. | 704/260 |
| 2002/0120653 | A1 * | 8/2002 | Kraft et al. .................... | 707/529 |
| 2003/0187656 | A1 * | 10/2003 | Goose et al. ............... | 704/270.1 |
| 2003/0223088 | A1 * | 12/2003 | Wu et al. ........................ | 358/1.1 |
| 2004/0066966 | A1 * | 4/2004 | Schneiderman .............. | 382/159 |
| 2004/0194025 | A1 * | 9/2004 | Hubert et al. ................. | 715/513 |
| 2007/0168378 | A1 * | 7/2007 | Dev Sareen et al. .......... | 707/102 |

(Continued)

OTHER PUBLICATIONS

Li et al., Creating MAGIC: System for Generating Learning Object Metadata for Instructional Content, ACM 2005, pp. 367-370.*

(Continued)

*Primary Examiner* — Cong-Lac Huynh
(74) *Attorney, Agent, or Firm* — Allen, Oyer et al.

(57) ABSTRACT

A method to convert visually orientated objects to embedded text is disclosed. In a particular embodiment, the method includes scanning an electronically stored document, identifying at least one visually orientated object within the document, analyzing the at least one visually orientated object to generate a textual description of the at least one visually orientated object, and embedding the textual description within the electronically stored document, and storing a converted document with the embedded textual description for distribution to users of text to speech synthesizers and Braille output devices. In addition, the method includes identifying text characters within the at least one visually orientated object. The text characters within the at least one visually orientated object are used in generating the textual description of the visually orientated object. A color of the textual description embedded within the electronic document is a background color of the electronic document and visually undetectable.

20 Claims, 7 Drawing Sheets

(56) References Cited

U.S. PATENT DOCUMENTS

| | | | |
|---|---|---|---|
| 2007/0177824 A1* | 8/2007 | Cattrone et al. | 382/306 |
| 2007/0245230 A1* | 10/2007 | Cherkasov | 715/512 |
| 2008/0278520 A1* | 11/2008 | Andreasson | 345/647 |
| 2009/0129755 A1* | 5/2009 | Rakib et al. | 386/124 |
| 2009/0217254 A1* | 8/2009 | Shneerson et al. | 717/168 |
| 2009/0244640 A1* | 10/2009 | Shiitani et al. | 358/3.28 |
| 2009/0254643 A1* | 10/2009 | Terheggen et al. | 709/223 |
| 2009/0316161 A1* | 12/2009 | Yamaguchi et al. | 358/1.2 |
| 2010/0042424 A1* | 2/2010 | Turakhia | 705/1 |
| 2010/0063821 A1* | 3/2010 | Marsh et al. | 704/260 |
| 2010/0104184 A1* | 4/2010 | Bronstein et al. | 382/170 |
| 2010/0250497 A1* | 9/2010 | Redlich et al. | 707/661 |
| 2011/0179344 A1* | 7/2011 | Paxson | 715/205 |
| 2011/0252315 A1* | 10/2011 | Misawa et al. | 715/256 |
| 2011/0276576 A1* | 11/2011 | David | 707/746 |
| 2012/0008864 A1* | 1/2012 | Kanatsu et al. | 382/176 |
| 2012/0023133 A1* | 1/2012 | Yeon | 707/770 |
| 2012/0042028 A1* | 2/2012 | Langoulant et al. | 709/206 |
| 2012/0203865 A1* | 8/2012 | Graham, Jr. | 709/219 |
| 2013/0002700 A1* | 1/2013 | Christensen et al. | 345/589 |

OTHER PUBLICATIONS

Chen et al., Multiple Representation Document Development, IEEE 1998, pp. 1-15.*

Ferreira et al., Audio Rendering of Mathematical Formulae Using MathML and AudioMath, Springer 2004, 391-399.*

* cited by examiner

METHOD AND SYSTEM TO CONVERT VISUALLY ORIENTATED OBJECTS TO EMBEDDED TEXT

I. FIELD

The present invention relates in general to the field of translating documents for the visually impaired, and in particular to a method and system to convert visually orientated objects to embedded text within an electronically stored document.

II. DESCRIPTION OF RELATED ART

Computerized document retrieval has become an essential function of modern computers. Computerized documents are traditionally rendered to the operator via a video display device such as a Cathode Ray Tube (CRT) monitor, Liquid Crystal Display (LCD), Light Emitting Diode (LED) display, plasma display or some other display device. Computerized documents may also be rendered to the operator by non-visual devices such as text to speech synthesizers, Braille embossers/printers, refreshable Braille displays, and the like. These rendering devices provide the mechanics of accessing computerized documents for communication to the user audibly.

A disparity exists between the content that various rendering devices or mediums can convey to the operator. For example, while an image of a signature or script may be rendered visually on a computer display monitor, an image of a signature or script is problematic to render using a text to speech screen reader, Braille embosser/printer, or refreshable Braille display. This disparity is most evident to persons with disabilities, such as the sight impaired who cannot directly access the computerized document's content using computer display monitors.

The United States Federal Government has addressed this disparity through creation of regulations under the Section 508 Compliance of the Rehabilitation Act. Section 508 regulations require Federal departments and agencies that develop, procure, maintain, or use electronic and information technology to ensure that Federal employees and members of the public with disabilities have access to and use of information and data, comparable to that of the employees and members of the public without disabilities—unless it is an undue burden to do so.

However, during common circumstances and typical usage, no adequate method has been provided for reducing or eliminating this disparity through manipulation of the contents of the electronic document so as to address Section 508 compliance for visually orientated objects of the documents that are not readily converted by a text to speech reader or Braille output device.

Accordingly, there is a need in the relevant art for a system and method that provides the sight disabled person the ability to accurately access the content of electronic documents, including visually orientated objects that do not directly convert to speech or Braille.

There is also a need in the art for a system and method that allows manipulation of the contents of electronic documents so that they communicate visually orientated objects, which may be difficult to convert to speech or Braille, without unduly affecting the appearance of the visually rendered original document.

There is also a need in the art for a system and method that allows computerized documents to be similarly conveyed to non-disabled and disabled persons using commonly available computer software, eliminating the need for disabled persons to procure, install and utilize specialized hardware or software for the rendering procedure.

Another need exists in the art for a system and method that implements the manipulation of the contents of the electronic documents in a fashion that is straightforward and undemanding for both manual and automatic implementation.

However, in view of the prior art at the time the present invention was made, it was not obvious to those of ordinary skill in the pertinent art how the identified needs could be fulfilled.

III. SUMMARY

In a particular embodiment, a method of converting visually orientated objects to embedded text is disclosed. The method includes scanning an electronically stored document, identifying at least one visually orientated object within the document, analyzing the at least one visually orientated object to generate a textual description of the at least one visually orientated object, and embedding the textual description within the electronically stored document and saving as a converted document. In addition, the method may include identifying text characters within the at least one visually orientated object. The text characters within the at least one visually orientated object are used in generating the textual description of the visually orientated object. A color of the textual description embedded within the electronic document is a background color of the electronic document. The text point size of the textual description may also be the smallest size allowed by the electronic document so that the textual description is visually undetectable but may be detectable by a text to speech synthesizer or Braille output device.

In another particular embodiment, a system of converting visually orientated objects to speech is disclosed. The system includes an electronically stored document, a scanning software module to scan the at least one electronically stored document, an identification software module to identify at least one visually orientated object within the document, an analysis software module to analyze the at least one visually orientated object to generate a textual description of the at least one visually orientated object, and an insertion module to embed the textual description within the electronically stored document so that the electronically stored document can be saved as a converted document. In addition, the system includes that a color of the textual description inserted within the electronic document is a background color of the electronic document and visually undetectable but may be detectable by a text to speech synthesizer or Braille output device. The placement of the textual description embedded within the document is proximate to the at least one visually orientated object and a font size of the textual description is adjusted to minimize an impact to the aesthetics of the document.

One particular advantage provided by embodiments of the method and system to convert visually orientated objects to embedded text is that the accessibility of the contents of an electronic document is improved without unduly affecting the visual appearance of the original document. Another particular advantage provided by the embodiments is that the system and method to convert visually orientated objects to embedded text may be implemented manually by a user instead of using modules, then the converted document can be saved electronically to distribute to users of text to speech synthesizers and Braille output devices. This provides the simplicity of human intervention with the economy of computer implementation.

The conversion of the visually orientated objects to text may be effected using common industry-standard software including, but not limited to, word processor, page layout, desktop publishing or presentation software. In addition, the documents with the conversion of the visually orientated objects to text may be accessed using a standard text to speech synthesizer, Braille embosser/printer or refreshable Braille display.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
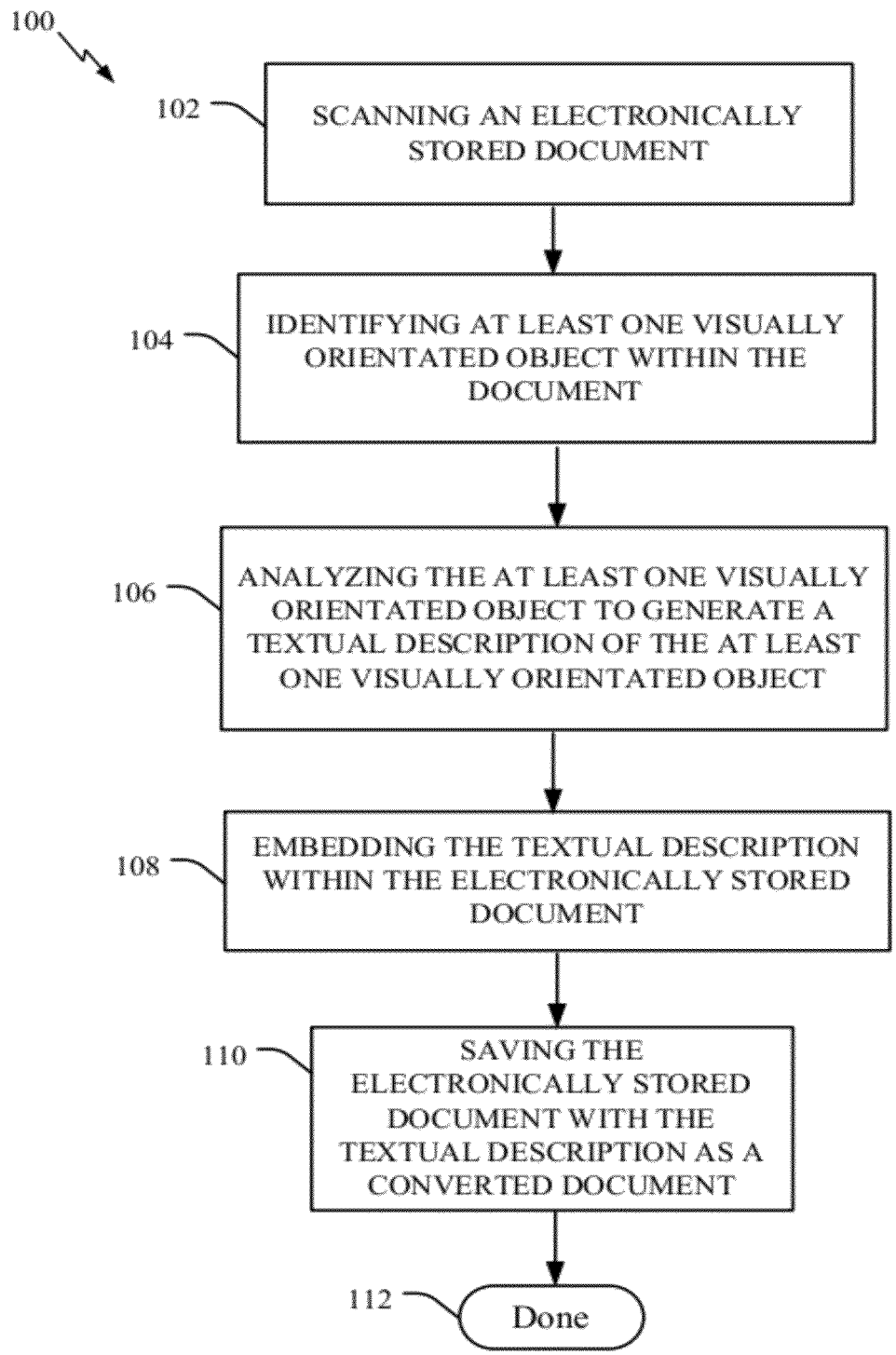
FIG. 1 is a flow diagram of a particular embodiment of a method to convert visually orientated objects to embedded text.

As disclosed below, the method and system to convert visually orientated objects to embedded text includes adding concealed descriptive text in an electronic document to allow accurate rendition for text to speech synthesizers and Braille output devices. Descriptive text for visually orientated objects is embedded to the electronic document but is concealed from casual visual presentation.

The descriptive text may be concealed through manipulation of the text's character and paragraph attributes which govern the text's presentation in the electronic document. Typographic attributes of the descriptive text that may be manipulated to render the text concealed include, but are not limited to, size, color, transparency, placement, horizontal spacing, vertical leading, kerning and tracking, for example.

Content in an electronic document which can benefit from the method and system to convert visually orientated objects includes, but is not limited to, images, photos, line art, signatures, handwriting script, icons, embellished fonts, mast heads, headers, footers, abbreviations and tables, for example.

The method further includes the manipulation and modification of the contents of the electronic document to include textual descriptions of numbers and/or data which may be intrinsically visually recognizable but not necessarily immediately recognizable when rendered non-visually. In one embodiment, content which includes numeric data representing a telephone number, such as 800-555-1212, may be manipulated and modified by embedding the textual description "Phone number" prefixing the numeric data.

The method further provides the ability to insert concealed text to separate adjacent digits of specific numeric data including, but not limited to, phone numbers, zip codes and social security numbers, using one or more characters including, but not limited to, space character, period and comma, to effect correctly vocalized output for many popular contemporary voice-based screen reader applications which typically expand multi-digit data such as the zip code "90210" into "ninety thousand two hundred ten" for example.

The method further includes the ability for the modifications to the electronic document to be realized by layering the modifications overlapping and/or being overlapped by existing elements in the electronic document.

In one embodiment, the method and system to convert visually orientated objects to embedded text may be incorporated with a word processor editor such as Microsoft Word, a page layout application such as Adobe InDesign, a desktop publishing application such as Quark XPress, or some other application software which allows manipulation of the aforementioned text and/or character typographic attributes contemporaneously. The electronic document is initially scanned for visually orientated objects. Once they are detected and analyzed, a textual description of the content is inserted adjacent to the object and the textual description may be concealed through manipulation of the textual description's character and paragraph attributes such as text size and color. The method is repeated until the entire electronic document is redressed and the converted document with the embedded text can be saved and distributed to users. The desired result is for the edited/converted document to be visually equivalent to the original electronic document but to communicate additional descriptive information of the visually orientated objects of the document when rendering with a text to speech synthesizer or Braille output device.

In another embodiment, the method and system may make modifications to the margins of the area affected by the insertion of the concealed textual descriptions to improve the visual similarity of the modified electronic document with the original electronic document. The margins affected may include, but not be limited to, left margin, right margin, top margin, bottom margin, inter-column margins, header margin, footer margin, footnote margins, text-repel margins for images, image box margins, or the like.

In another embodiment, the method and system may scan the electronic document for instances of abbreviations such as the names of U.S. states and modify the abbreviation to include the full description as concealed text, such as the full state name. Other abbreviations that may be applicable for modification include, but are not limited to, salutations, countries, provinces, military ranks, structured numeric data, and places of interest, for example.

A flow diagram of a particular embodiment of a method to convert visually orientated objects to embedded text is described in FIG. 1 and generally designated 100. At 102, an electronically stored document is scanned. The scanning element may be incorporated into an existing word processing application or be a stand-alone application. Moving to 104, at least one visually orientated object within the document is identified. The at least one visually orientated object is analyzed, at 106, to generate a textual description of the at least one visually orientated object. The textual description is embedded within the electronically stored document, at 108. The converted document with the embedded textual description is saved, at 110, for distribution to users of text to speech synthesizers and Braille output devices.

Figure 2:
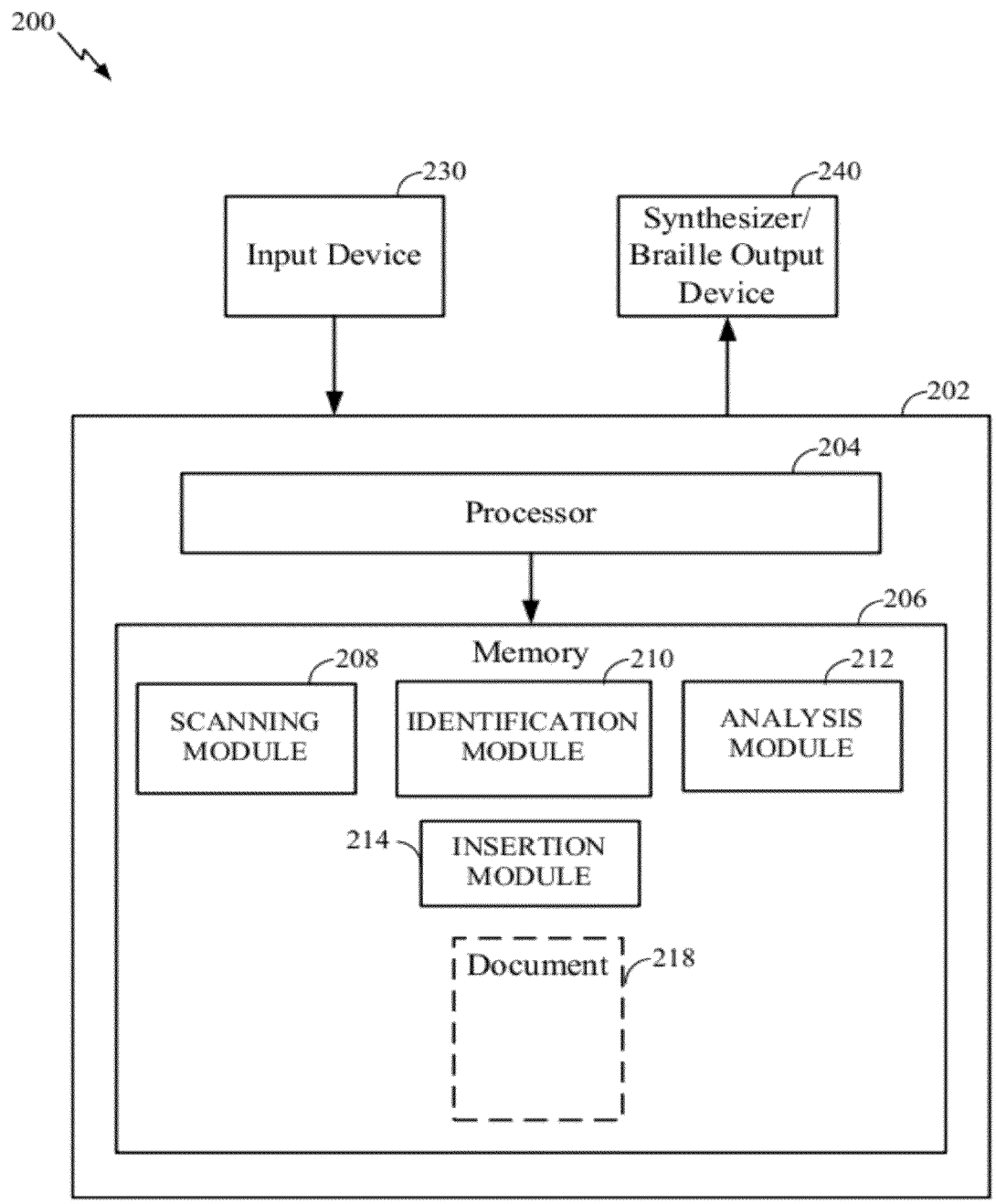
FIG. 2 is a block diagram of a particular illustrative embodiment of a system to convert visually orientated objects to embedded text.
Figure 3:
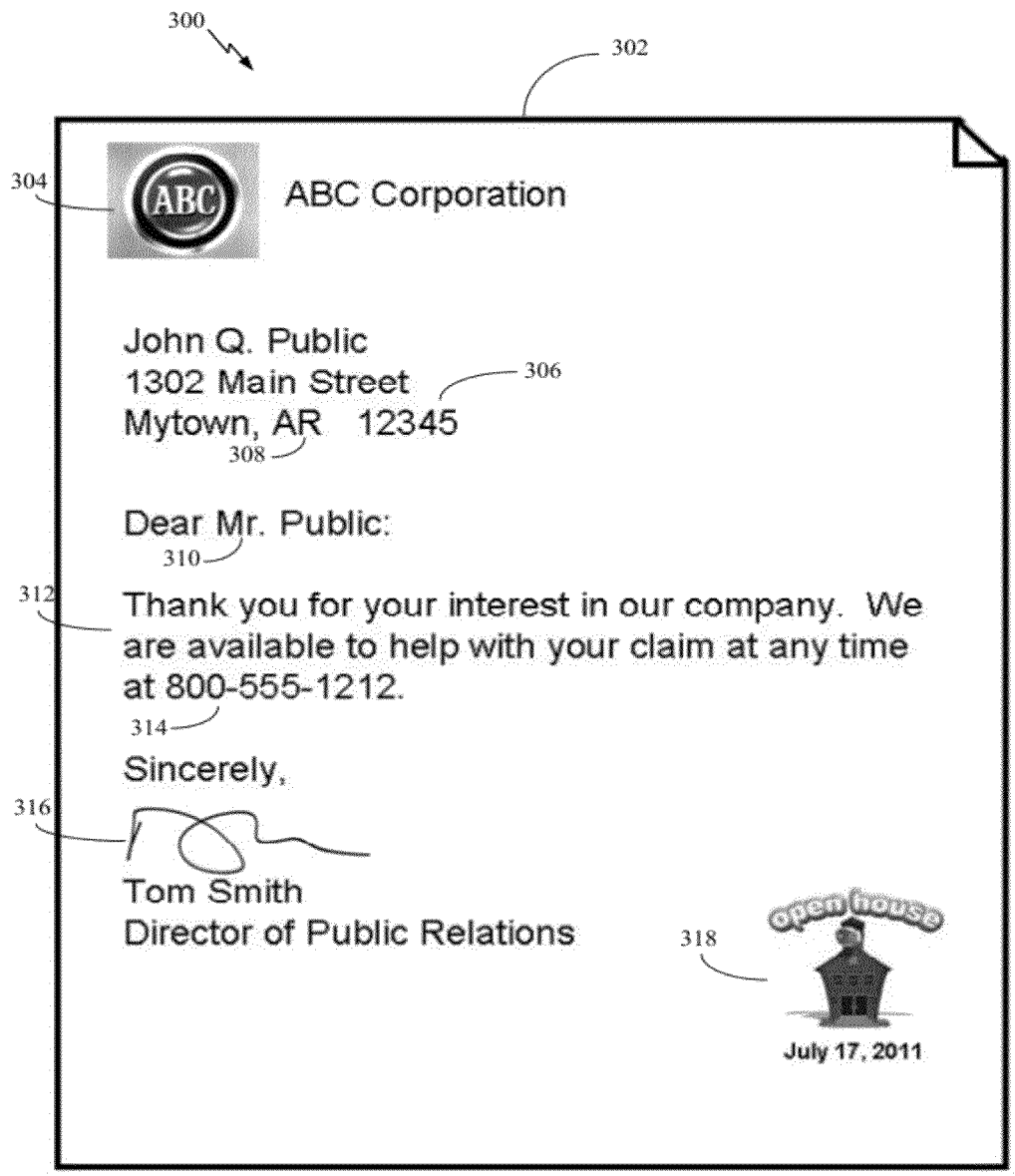
FIG. 3 is a screen shot of a particular illustrative embodiment of an electronically stored document having visually orientated objects to be converted to embedded text.

Referring to FIG. 2, a particular illustrative embodiment of a system to convert visually orientated objects to embedded text is depicted and generally designated 200. The system 200 includes a processor 204 that is communication with an input device 230, where a memory 206 of a server 202 may be adapted to store content of an electronic document 218. In a particular illustrative embodiment, the content of the electronic document 218 may include visually orientated objects. A scanning module 208 may be used to scan the at least one electronically stored document 218, an identification module 210 may be used to identify at least one visually orientated object within the document 218, an analysis module 212 may be used to analyze the at least one visually orientated object to generate a textual description of the at least one visually orientated object, and an insertion module 214 may be used to embed the textual description within the electronically stored document 218. In addition, the system 200 includes that a color of the textual description inserted within the electronic document may be the same background color of the electronic document 218 and visually undetectable but detectable by a text to speech synthesizer or Braille output device. The placement of the textual description inserted within the document 218 may be proximate to the at least one visually orientated object and a font size of the textual description is adjusted to minimize an impact to the aesthetics of the document 218. The converted document with the embedded textual description is electronically saved and may be distributed to users of text to speech synthesizers and Braille output devices. In addition, a synthesizer or Braille output device 240 may be in direct communication with the server 202, where the synthesizer or Braille output device is able to render the converted document with the embedded textual descriptions of the visually orientated objects and other text.

The modules 208, 210, 212, 214 may be implemented in hardware, firmware, software, other programmable logic, or any combination thereof. The memory 206 includes media that is readable by the processor 204 and that stores data and program instructions of the software modules 208, 210, 212, 214 that are executable by the processor 204. Additionally, the input device 230 may be a keyboard, mouse, light pen, track ball, track pad, joy stick, graphics tablet, touch screen, or other pointing device or any combination thereof that is accessible to the processor 204. Additionally, the system 200 may include a display, for example, a cathode ray tube (CRT) display, liquid crystal display (LCD), light emitting diode (LED) display, plasma display, or other display device that is accessible to the processor 204 to display the electronic document 218 to a user.

Referring now to FIGS. 3-6, in operation the method and system scans an original electronic document 302 that is displayed. In this particular example, the method and system identifies a text message 312, a photograph 304, a signature 316 and a graphic 318, as visually orientated objects. Those visually orientated objects are analyzed in addition to analyzing the Arkansas abbreviation 308, the zip code 306, the Mister abbreviation 310, and the description of the telephone number 314.

Figure 4:
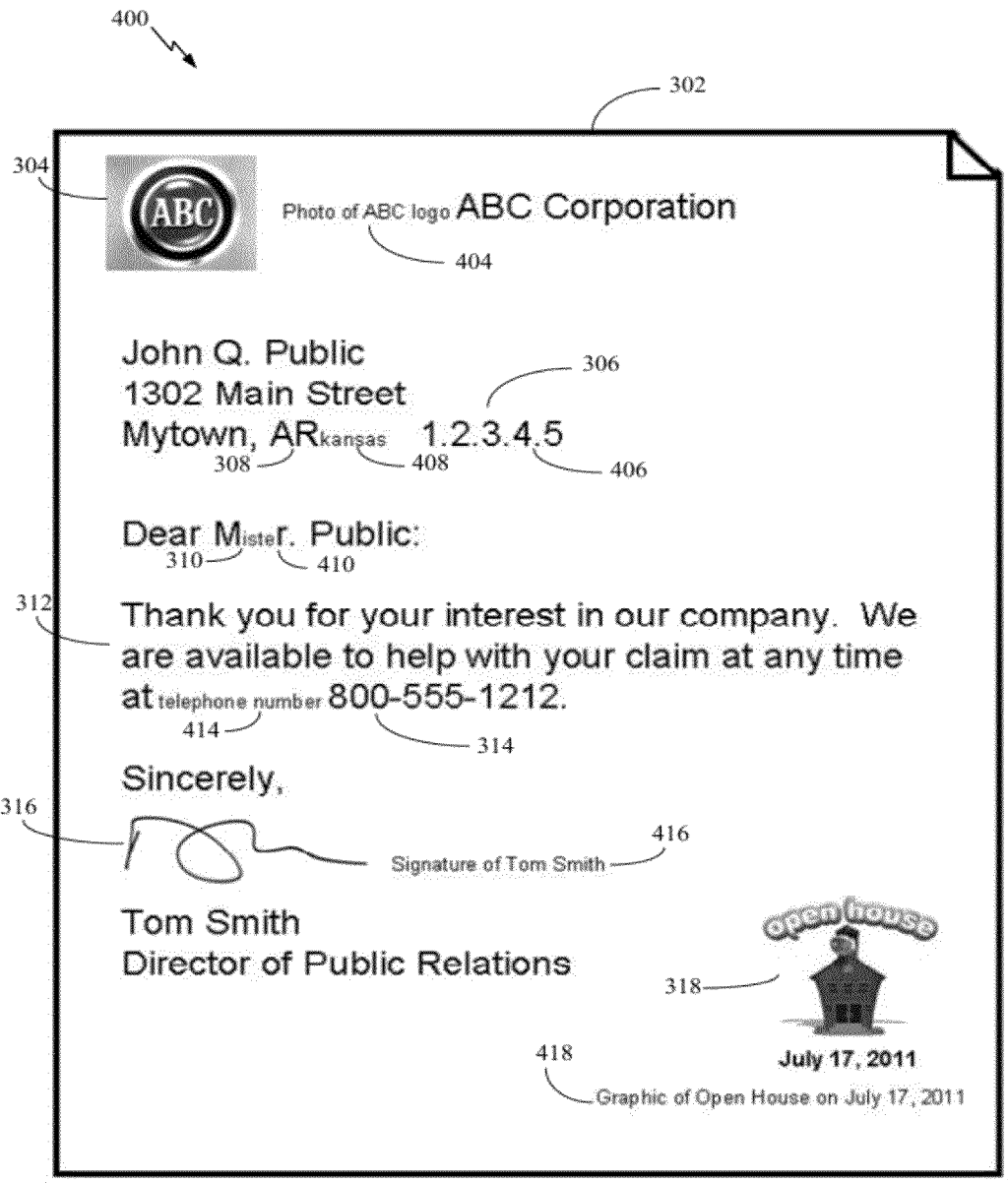
FIG. 4 is a screen shot of a particular illustrative embodiment of the display generated by the method and system to convert visually orientated objects to embedded text.

Referring now to FIG. 4, the method and system has inserted and embedded descriptive text proximate to the visually orientated objects 312, 304, 316, 318 as well as expanding on other textual objects 308, 306, 310, 314, that may be analyzed and have descriptive text inserted.

Figure 5:
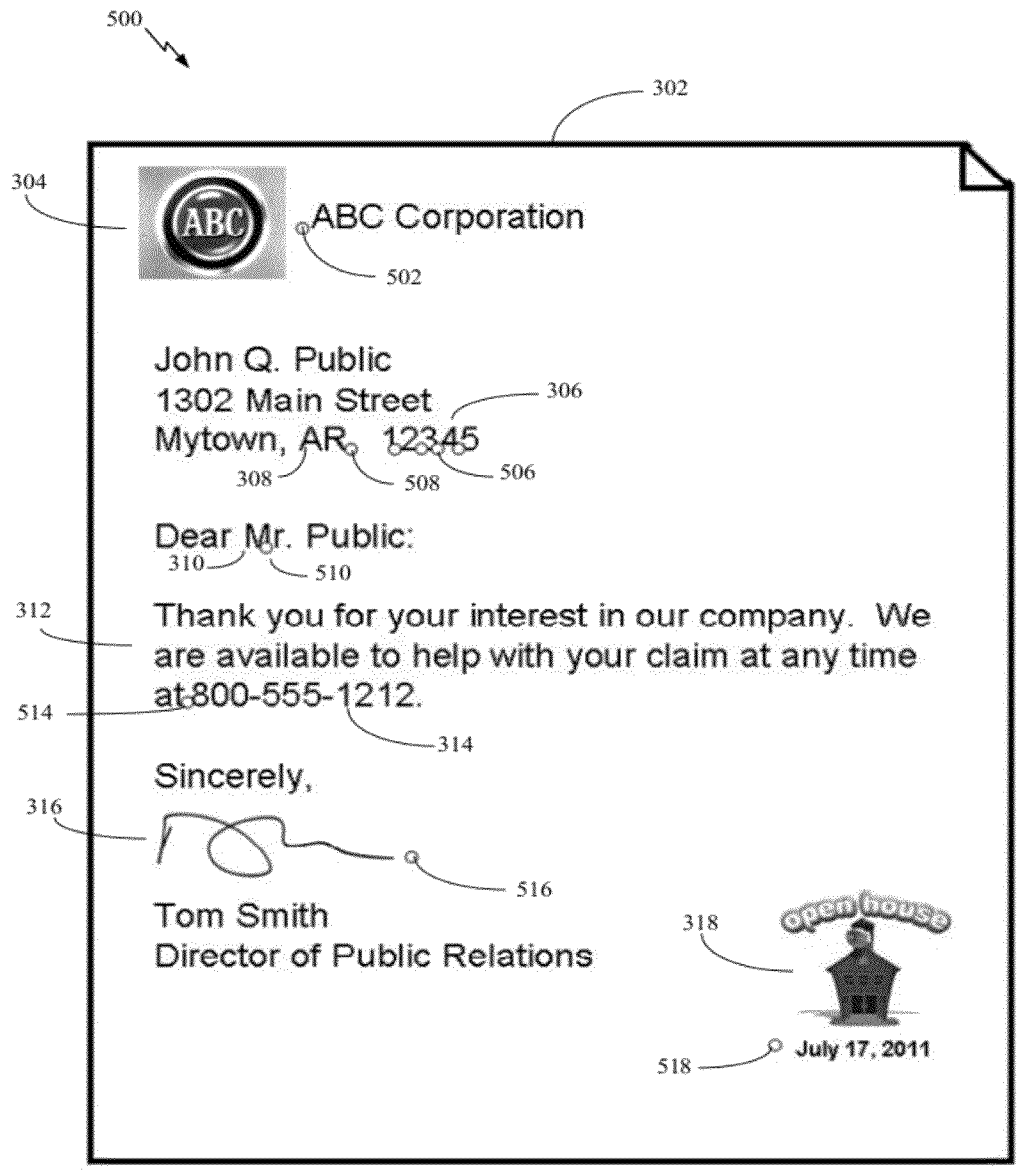
FIG. 5 is a screen shot of a particular illustrative embodiment of the display generated by the method and system to convert visually orientated objects to embedded text, where the embedded textual descriptions of the visually orientated objects have been concealed to minimize an impact to the aesthetics of the document.

FIG. 5 is an illustrative example of the method and system where descriptive text is embedded within the content of the electronic document enabling text to speech synthesizers and Braille output devices to communicate elements normally difficult to express without visual benefit. The electronic document 410 is shown in its final state where descriptive text has been embedded into the electronic document and the descriptive text has been visually concealed by reducing the descriptive text to a 1 point size font, and given a white text color matching the background color, or a transparent color. For illustrative purposes only, the visually concealed descriptive text 502, 506, 508, 510, 514, 516, 518 are located within white circles but the white circles do not appear on the electronic document 302 in actuality.

Figure 6:
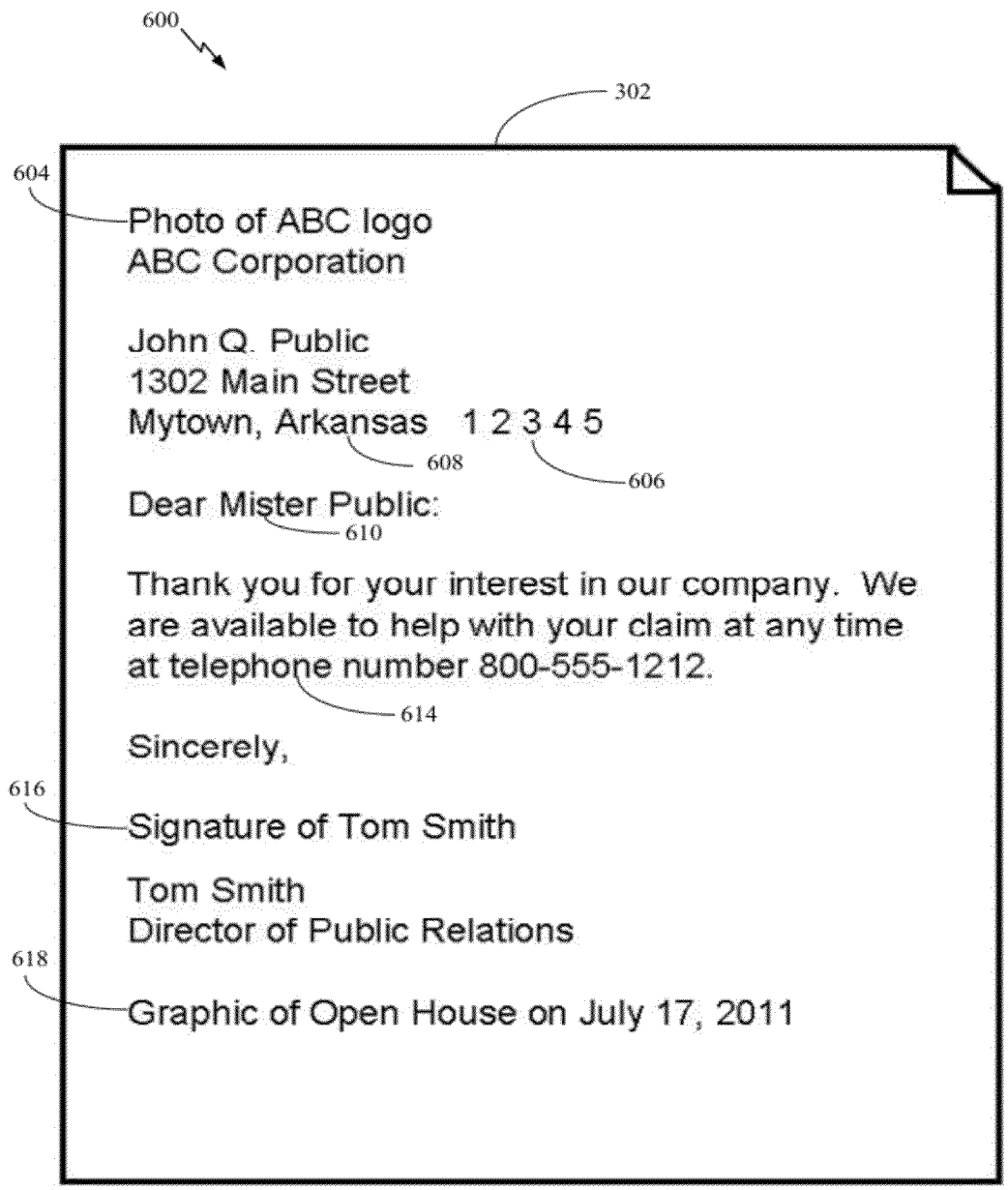
FIG. 6 is a screen shot of a particular illustrative embodiment of the method and system to convert visually orientated objects as viewed by a text to speech synthesizer or Braille output device.

Referring now to FIG. 6, a representation of the textual content of the electronic document that is communicated to a text to speech synthesizer or Braille reader, for example, is illustrated where the original electronic document has been converted using the method and system described herein.

Figure 7:
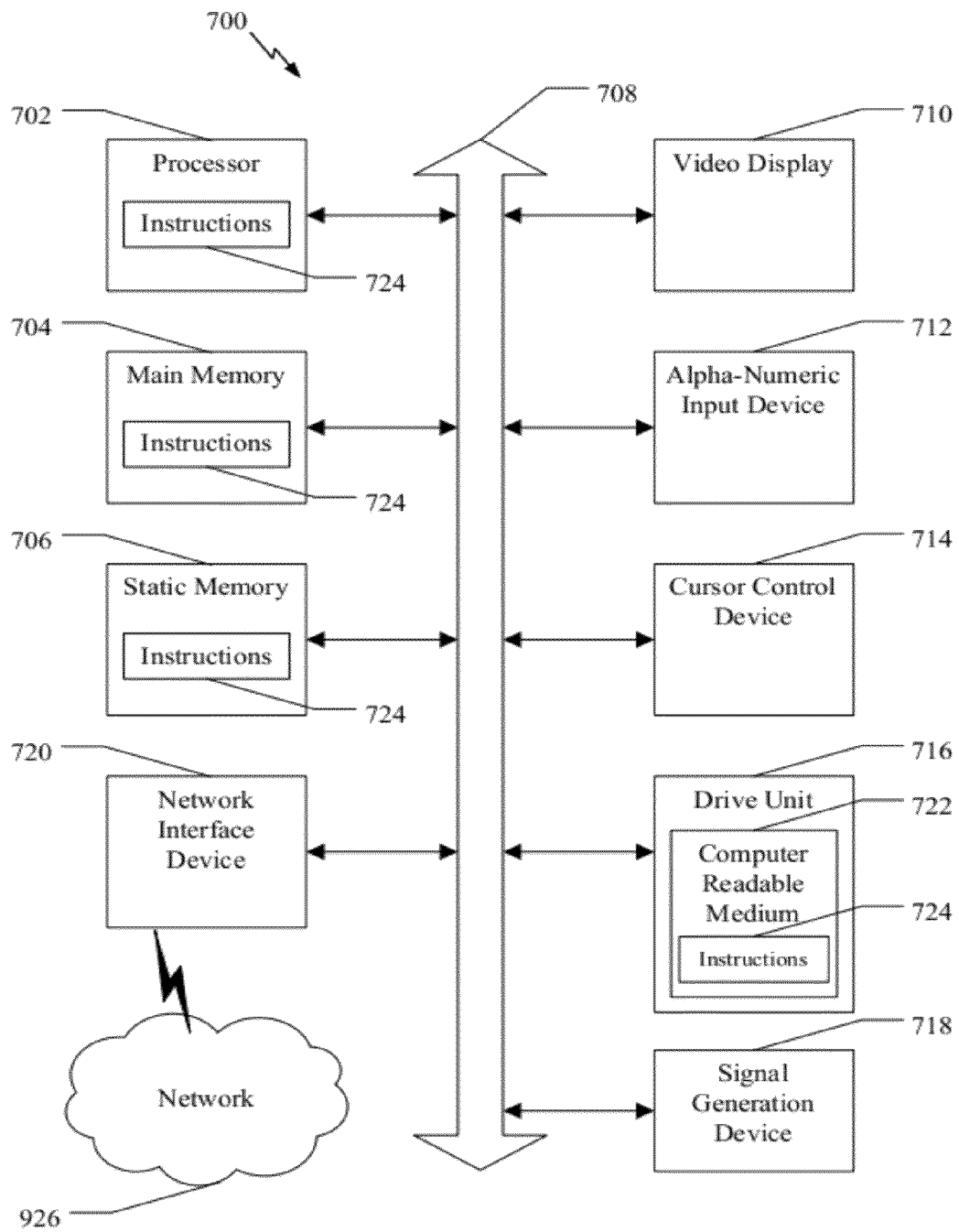
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices.

In a networked deployment, the computer system may operate in the capacity of a server, such as a video server or application server, or a media device. The computer system 700 can also be implemented as or incorporated into various devices, such as a personal computer (PC), a personal digital assistant (PDA), a mobile device, a palmtop computer, a laptop computer, a desktop computer, a communications device, a wireless telephone, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), a flat panel display, a solid-state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a digital signal processor, microprocessor, or in any combination thereof. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method to convert a visually orientated object to embedded text, the method comprising:
    scanning an electronically stored document;
    identifying at least one visually orientated object within the document;
    analyzing the at least one visually orientated object to generate a textual description of the at least one visually orientated object;
    reducing a font size of the textual description until the textual description is visually concealed to a user; and
    embedding the textual description within the electronically stored document, wherein the textual description is detectable by a text to speech synthesizer or Braille output device.

2. The method of claim 1, further comprising saving the electronically stored document with the textual description as a converted document.

3. The method of claim 2, further comprising identifying text characters within the at least one visually orientated object.

4. The method of claim 3, further comprising using the text characters within the at least one visually orientated object in generating the textual description of the visually orientated object.

5. The method of claim 4, wherein a color of the textual description embedded within the electronic document is a background color of the electronic document or transparent, and visually undetectable.

6. The method of claim 5, wherein placement of the textual description embedded within the document is proximate to the at least one visually orientated object.

7. The method of claim 6, wherein a font size, typographic character attribute, paragraph attribute, page attribute, or any combination thereof, of the textual description is adjusted to minimize an impact to the aesthetics of the document.

8. The method of claim 7, further comprising determining whether the at least one visually orientated object is a photograph, graphic image, signature, zip code, phone number, abbreviation, or any combination thereof.

9. A non-transitory processor readable medium having processor instructions that are executable to cause a processor to:
    scan an electronically stored document;
    identify at least one visually orientated object within the document;
    analyze the at least one visually orientated object to generate a textual description of the at least one visually orientated object;
    reduce a font size of the textual description until the textual description is visually concealed to a user; and
    embed the textual description within the electronically stored document, wherein the textual description is detectable by a text to speech synthesizer or Braille output device.

10. The non-transitory processor readable medium of claim 9, wherein the processor executable instructions are further executable to save the electronically stored document as a converted document.

11. The non-transitory processor readable medium of claim 10, wherein the processor executable instructions are further executable to identify text characters within the at least one visually orientated object.

12. The non-transitory processor readable medium of claim 11, wherein the processor executable instructions are further executable to use the text characters within the at least one visually orientated object in generating the textual description of the visually orientated object.

13. The non-transitory processor readable medium of claim 12, wherein a color of the textual description embedded within the electronic document is a background color of the electronic document or transparent, and visually undetectable.

14. The non-transitory processor readable medium of claim 13, wherein placement of the textual description embedded within the document is proximate to the at least one visually orientated object.

15. The non-transitory processor readable medium of claim 14, wherein a font size, typographic character attribute, paragraph attribute, page attribute, or any combination thereof of the textual description is adjusted to minimize an impact to the aesthetics of the document.

16. The non-transitory processor readable medium of claim 15, wherein the processor executable instructions are further executable to determine whether the at least one visually orientated object is a photograph, graphic image, signature, zip code, phone number, abbreviation, or any combination thereof.

17. A system to convert a visually orientated object to speech, the system comprising:
- a processor in communication with an input device;
- an electronically stored document in a memory for electronically storing a document;
- a scanning software module stored in the memory to scan the at least one electronically stored document;
- an identification software module stored in the memory to identify at least one visually orientated object within the document;
- an analysis software module stored in the memory to analyze the at least one visually orientated object to generate a textual description of the at least one visually orientated object; and
- an insertion module stored in the memory to reduce a font size of the textual description until the textual description is visually concealed to a user and to embed the textual description within the electronically stored document,
- wherein the textual description is detectable by text to speech synthesizers and Braille output devices.

18. The system of claim 17, wherein a color of the textual description embedded within the electronic document is a background color of the electronic document or transparent, and visually undetectable.

19. The system of claim 18, wherein placement of the textual description embedded within the document is proximate to the at least one visually orientated object.

20. The system of claim 19, wherein a font size, typographic character attribute, paragraph attribute, page attribute, or any combination thereof, of the textual description is adjusted to minimize an impact to the aesthetics of the document.

* * * * *